Nov. 23, 1948.  J. J. DEUTSCH ET AL  2,454,735
ICE-CREAM SCOOP
Filed July 20, 1946
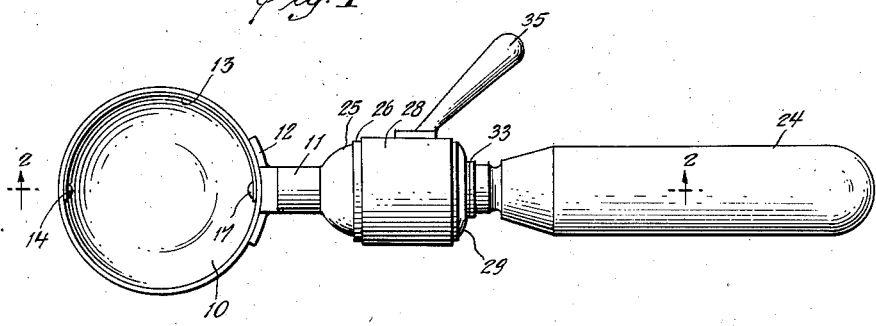
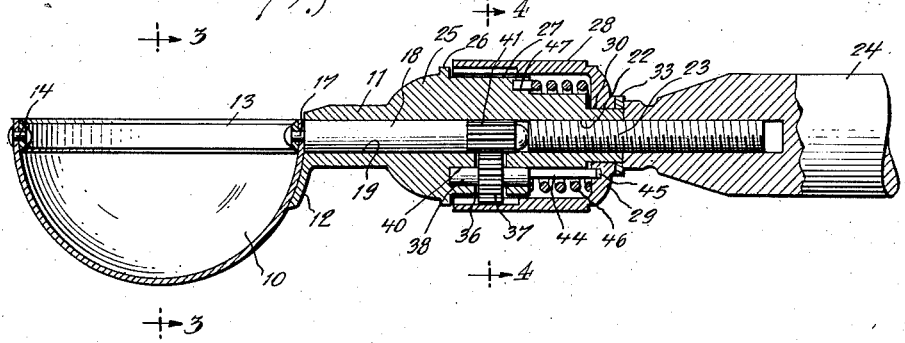
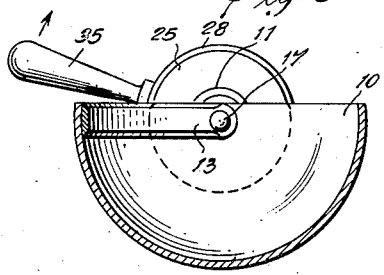
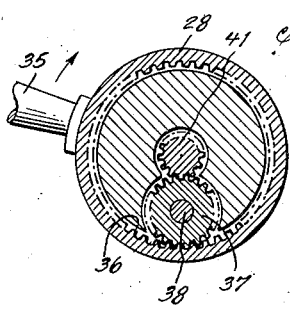
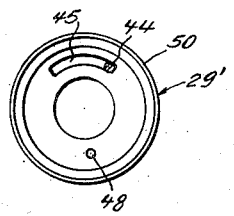
INVENTORS
Joseph J. Deutsch
BY John Vigilante
John P. Chandle
their ATTORNEY Patented Nov. 23, 1948

2,454,735

UNITED STATES PATENT OFFICE 2,454,735

ICE-CREAM SCOOP

Joseph J. Deutsch, Norwalk, Conn., and John Vigilante, New York, N. Y.; said Vigilante assignor to said Deutsch Application July 20, 1946, Serial No. 685,221

7 Claims. (Cl. 107—48)

This invention relates to ice cream scoops, and relates more particularly to a structurally and functionally improved scoop for dispensing frozen confections and other materials.

An important object of the invention is to provide an article of this character which includes a generally hemispherical bowl with reasonably sharp edges to facilitate cutting into the frozen material, and a wiper element of semi-circular shape pivotally mounted adjacent opposed edges of the bowl for discharging the material therefrom, the invention being characterized by improved means for actuating the wiper through an arc to quickly discharge the ice cream.

In accordance with the present invention, the bowl is mounted at one end of a shank provided with a longitudinal bore, a handle being mounted at the opposite end of the shank. The bore forms a journal for a shaft which rotates the wiper. A manually-rotatable sleeve is journalled externally of the shank near its central portion which preferably is somewhat enlarged. The sleeve is provided with an internal gear which rotates the shaft, preferably through an idler which engages a pinion mounted at the inner end of the shaft.

Thus, the sleeve forms a housing which encloses the operative parts of the device, making it easy to clean and to retain clean. The mechanism eliminates the need for links, bell-crank levers, and other exposed elements which characterized the prior devices of the art. The device is neat and streamlined in appearance, is simple to operate, and has no parts likely to get out of order.

In the drawings:

Fig. 1 is a plan view of an ice cream scoop constructed in accordance with the present invention.

Fig. 2 is a section taken on line 2—2 of Fig. 1.

Fig. 3 is a section taken on line 3—3 of Fig. 2.

Fig. 4 is a section taken on line 4—4 of Fig. 2.

Fig. 5 is a front elevation of a separately formed end wall for the rotating sleeve.

The ice cream scoop of the present invention may comprise a generally hemispherical bowl 10 which may be formed in any desired manner, such as being pressed from sheet metal. It is mounted at one end of a shank 11 which is provided at such end with a curved flange 12 whose outer surface is of the same general contour as the external contour of the bowl, such flange being secured as by means of soldering, welding, or otherwise, to the bowl. The bowl is further provided with a wiper element 13 of generally semi-circular shape. At its outer end the wiper element is pivotally secured adjacent the marginal edge of the bowl as by means of a pivot pin 14. At its opposite end the wiper element is keyed by suitable means, such as a pin 17, to the outer end of a wiper shaft 18 which is journalled within a longitudinal bore 19 extending inwardly from the outer end of the shank. Axially aligned with bore 19 is a threaded bore 22 which receives a threaded stud 23 which provides a support for a handle 24.

The shank is further formed with an enlarged portion 25 on whose outer periphery is formed an annular flange 26 defining one end of a slightly reduced portion 27 which forms a journal support for a rotatable sleeve 28. At its opposite end sleeve 28 is provided with an end wall 29 which is journalled on a reduced portion 30 of the shank. A washer 33 is positioned between the end wall 29 of the sleeve and the adjacent terminal of the handle. A manually-rotatable crank 35 is secured externally of the sleeve. The sleeve is further provided with an internal gear 36 which meshes with an idler 37 mounted on a shaft 38 which is mounted within aligned apertures 40 eccentrically of the axis of shaft 18. Idler 37 engages a pinion 41 secured at the inner end of wiper shaft 18. Idler shaft 38 is provided with an extension 44 whose rear terminal is positioned within an arcuate slot 45 in end wall 29 of the sleeve, such slot limiting rotative movement of the sleeve.

Thus, the rotation of the sleeve in one direction is effected by depressing crank 35, and return rotation is effected by means of a spring 46 carried concentrically of the shank, one end of such spring being positioned within a recess 47 in the shank, and the other end of the spring being positioned within an opening 48 in the end wall 29 of the sleeve.

In Fig. 2 the sleeve 28 and end wall 29 are shown as being integrally formed. In Fig. 5, however, the end wall is shown as a separate element 29'. It is provided on its outer periphery with an annular flange 50 which may be received within a suitable annular recess (not shown) in the outer periphery of the sleeve. This view also shows arcuate slot 45 which receives extension portion 44 of idler shaft 38.

It will be appreciated that since the entire mechanism for operating the wiper is completely housed, the scoop of the present invention is far more sanitary than are conventional scoops.

It was earlier pointed out that the device of the present invention, while designed primarily as an ice cream scoop, may nevertheless be used for dispensing other materials. Accordingly, the reference to "an ice cream scoop" in the appended claims is not to be taken in any limiting sense.

While two forms or embodiments of the invention have been shown and described herein for illustrative purposes, and the construction and arrangement incidental to two specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What we claim is:

1. An ice cream scoop comprising a tubular shank, a dispensing bowl and a handle mounted, respectively, at opposite ends of the shank, a wiper pivotally mounted within the bowl, a shaft journalled within the shank and connected at one end thereof to the wiper and a pinion mounted at its opposite end, a manually-rotatable sleeve journalled externally of the shank and operatively connected with the wiper shaft to rotate the same.

2. An ice cream scoop comprising a tubular shank, a dispensing bowl and a handle mounted, respectively, at opposite ends of the shank, a wiper pivotally mounted within the bowl, a shaft journalled within the shank and connected at one end thereof to the wiper and a pinion mounted at its opposite end, and a manually-rotatable sleeve journalled externally of the shank and provided with an internal gear for rotating the pinion and the wiper shaft.

3. An ice cream scoop comprising a tubular shank, a dispensing bowl and a handle mounted, respectively, at opposite ends of the shank, a wiper pivotally mounted within the bowl, a shaft journalled within the shank and connected at one end thereof to the wiper and a pinion mounted at its opposite end, a manually-rotatable sleeve journalled externally of the shank and provided with an internal gear for rotating the pinion and the wiper shaft, and an idler positioned between the internal gear and the pinion, means for limiting rotation of the sleeve, and a spring for returning the sleeve to starting position.

4. An ice cream scoop comprising a bowl, a generally semi-circular wiper pivotally mounted at opposite ends thereof adjacent the edge of the bowl, a shank which is secured at one end thereof to the bowl, a handle mounted at the opposite end of the shank, the shank having a bore therein extending inwardly from its forward end, a shaft journalled within the bore and secured at its forward end to the wiper to rotate the same, a sleeve journalled externally of the shank, and gear means connecting the sleeve with the shaft to rotate the latter upon manual rotation of the former.

5. An ice cream scoop comprising a generally hemispherical bowl, a generally semi-circular wiper pivotally mounted at opposite ends thereof adjacent the edge of the bowl, a shank which is secured at one end thereof to the bowl, a handle mounted at the opposite end of the shank, the shank having a bore therein extending inwardly from its forward end, a shaft journalled within the bore and secured at its forward end to the wiper to rotate the same, a pinion mounted at the other end of the shaft, and a sleeve journalled externally of the shank and provided with internal gear teeth and an external manipulating handle, such gear teeth driving the pinion and the wiper shaft when the sleeve is rotated.

6. An ice cream scoop comprising a generally hemispherical bowl, a generally semi-circular wiper pivotally mounted at opposite ends thereof adjacent the edge of the bowl, a shank which is secured at one end thereof to the bowl, a handle mounted at the opposite end of the shank, the shank having a bore therein extending inwardly from its forward end, a shaft journalled within the bore and secured at its forward end to the wiper to rotate the same, a pinion mounted at the other end of the shaft, a sleeve journalled externally of the shank and provided with internal gear teeth and an external manipulating handle, and an intermediate idler which engages said gear teeth and the pinion to rotate the latter when the sleeve is rotated, a shaft upon which the idler is mounted, the sleeve having an arcuate slot therein, one end of the idler shaft projecting into the arcuate slot to limit rotation of the sleeve.

7. An ice cream scoop comprising a generally hemispherical bowl, a generally semi-circular wiper pivotally mounted at opposite ends thereof adjacent the edge of the bowl, a shank which is secured at one end thereof to the bowl, a handle mounted at the opposite end of the shank, the shank having a bore therein extending inwardly from its forward end, a shaft journalled within the bore and secured at its forward end to the wiper to rotate the same, a pinion mounted at the other end of the shaft, a sleeve journalled externally of the shank and provided with internal gear teeth and an external manipulating handle, an intermediate idler which engages said gear teeth and the pinion to rotate the latter when the sleeve is rotated, means for limiting rotation of the sleeve, and spring means for returning the sleeve to starting position after it has been manually rotated through an arc.

JOSEPH J. DEUTSCH.
JOHN VIGILANTE.

REFERENCES CITED

The following references are of record in the file of this patent:

UNITED STATES PATENTS

| Number | Name | Date |
|---|---|---|
| 741,015 | Craven | Oct. 13, 1903 |
| 820,473 | Buchanan | May 15, 1906 |
| 1,615,939 | Flegel | Feb. 1, 1927 |
| 1,747,737 | Ruetz | Feb. 18, 1930 |
| 2,160,585 | Gessler | May 30, 1939 |